(12) United States Patent
Cheng et al.

(10) Patent No.: US 9,544,792 B2
(45) Date of Patent: Jan. 10, 2017

(54) SYSTEM AND METHOD FOR JOINT SCHEDULING IN DUAL-CARRIER WIRELESS BACKHAUL NETWORKS

(71) Applicant: BLiNQ Wireless Inc., Ottawa (CA)

(72) Inventors: Ho Ting Cheng, Stittsville (CA); Alexandru Moraru, Toronto (CA); Akram Bin Sediq, Ottawa (CA); Radu Bogdan Selea, Vaughan (CA)

(73) Assignee: BLiNQ Wireless Inc., Kanata (CA)

( * ) Notice: Subject to any disclaimer, the term of this patent is extended or adjusted under 35 U.S.C. 154(b) by 212 days.

(21) Appl. No.: 14/314,878

(22) Filed: Jun. 25, 2014

(65) Prior Publication Data

US 2015/0382347 A1    Dec. 31, 2015

(51) Int. Cl.
*H04W 4/00*     (2009.01)
*H04W 24/08*    (2009.01)
*H04W 48/16*    (2009.01)

(52) U.S. Cl.
CPC .............. *H04W 24/08* (2013.01); *H04W 48/16* (2013.01)

(58) Field of Classification Search
CPC .................................................. H04W 72/0453
USPC ................................................. 370/254, 329
See application file for complete search history.

(56) References Cited

U.S. PATENT DOCUMENTS

| 2011/0075640 A1* | 3/2011 | Mo ....................... H04L 5/0007 370/336 |
| 2012/0236731 A1* | 9/2012 | Beaudin .............. H04W 72/082 370/248 |
| 2014/0043979 A1* | 2/2014 | Etemad ................ H04B 7/2656 370/237 |

* cited by examiner

*Primary Examiner* — Shripal Khajuria
(74) *Attorney, Agent, or Firm* — de Wilton Intellectual Property Inc.

(57) ABSTRACT

A system and method for joint scheduling in a dual-carrier fixed wireless backhaul network is disclosed, wherein the primary carrier is a licensed band, and the secondary carrier is an unlicensed or lower cost shared carrier. The network comprises a plurality of Hub modules, each serving a cluster of one or more Remote backhaul modules (RBMs). A special frame structure and a control channel on the primary carrier carries control signalling messages for RBMs assigned to either the primary or secondary carrier. RBMs with a performance metric, such a spectral efficiency, above a threshold are assigned to the primary carrier. Other RBMs are assigned the secondary carrier, and a channel assignment is then performed. A transmission mode is determined based on instantaneous channel conditions, to optimize overall system performance across a network neighborhood and meet RBM quality of service requirements. A centralized server/processing unit coordinates dual carrier joint scheduling functions.

22 Claims, 10 Drawing Sheets

Frame Structure

| RBMx,y | RBMx,y+1 | RBMx,y+2 | RBMx,y+3 |
|---|---|---|---|
| RBMx,z | RBMx,z+1 | RBMx,z+2 | RBMx,z+3 |

Primary Carrier

Secondary Carrier

Fig. 3

Network Topology View

Note: In this example, RBMs with lower spectral efficiency due to interference (coloured blue or green) are allocated to the secondary carrier (unlicensed band)

RBM-Hub association map

| | | | |
|---|---|---|---|
| Hub 1 | 1 | 2 | 3 | 4 |
| Hub 2 | 5 | 6 | 7 | 8 |
| Hub 3 | 9 | 10 | 11 | 12 |

Assign RBMs to slots and carriers such that a utility function is maximized

Fig. 7A

Licensed carrier

| | | | |
|---|---|---|---|
| Hub 1 | 1 | 1 | 3 | 2 |
| Hub 2 | 5 | 5 | 5 | 7 |
| Hub 3 | 11 | 9 | 11 | x |

Unlicensed carrier

| | | |
|---|---|---|
| 3 | 4 | 4 | 4 |
| 6 | 6 | 8 | 8 |
| 12 | 12 | 10 | 9 |

←— Available resource slots —→

Fig. 7B

- Default Carrier Assignment

- DCJS

SYSTEM AND METHOD FOR JOINT SCHEDULING IN DUAL-CARRIER WIRELESS BACKHAUL NETWORKS

CROSS-REFERENCE TO RELATED APPLICATIONS

This application is related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional patent application No. 61/382,217, filed Sep. 13, 2010; this application is also related to U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent applications No. 61/483,417, filed May 6, 2011 and No. 61/506,895, filed 12 Jul. 2011; all these applications are incorporated herein by reference in their entirety. This application is also related to U.S. patent application Ser. No. 14/255,068, entitled "System And Method For Coordinating Hub-Beam Selection In Wireless Backhaul Networks", filed Apr. 17, 2014, which is incorporated herein by reference in its entirety.

This application is also related to U.S. patent application Ser. No. 14/314,996 entitled "System and Method for Reception Mode Switching in Dual-Carrier Wireless Backhaul Networks", filed Jun. 25, 2014, which is incorporated herein by reference in its entirety.

TECHNICAL FIELD

The present invention relates generally to telecommunications service network technology, and particularly to a system and method for joint scheduling in dual-carrier fixed wireless backhaul networks.

BACKGROUND

Wireless backhaul networks are deployed to carry the traffic between a wireless access network and the core network. For example, as described in the above referenced related patent applications, a wireless backhaul network may comprise a plurality of hubs, each connected to the wired core network, via Ethernet. Each hub serves multiple Remote Backhaul Modules (RBM), in a point to multipoint or point to point configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. Performance of an RBM such as throughput is contingent upon its received Carrier-to-Interference-plus-Noise Ratio (CINR) and the amount of bandwidth allocated to this RBM given a selected carrier. The received signal strength of an RBM is determined by the transmit power of a serving hub and the pathloss between the serving hub and the RBM. The received interference-plus-noise level of an RBM is determined by the transmit powers of all the interfering hubs and the pathlosses between interfering hubs and the RBM. An RBM is affected by an interfering hub when the desired signal and an interfering signal are transmitted over the same carrier frequency.

In frequency reuse of 1 multi-sector deployment, there are two main types of interference, namely intra-cell interference and inter-cell interference. The problem of joint scheduling has been extensively researched in multiple dimensions, e.g., time, frequency and space. Fractional frequency reuse techniques coupled with power management have been researched and many methods proposed in the literature to obtain a good performance trade-off, the system performance of which, however, is far from an interference-free performance upper bound in terms of capacity and reliability.

To achieve the close-to upper bound performance in point-to-multi-point backhaul systems, a common approach is to use a larger spectrum (e.g., frequency reuse of 3). However, the spectrum is expensive and may not always be available for use. Another approach is to perform interference cancellation or rejection, which is generally computationally expensive and is not always effective especially with channel estimation errors.

In typical wireless backhaul networks, hubs and RBMs are deployed at fixed locations, and hubs are located at elevated locations with sufficient height above obstacles or other environmental clutter. For example, in an urban area, hubs may be positioned on a tall building or a rooftop, above the clutter. Each RBM is typically co-located with an access network base station, e.g. for a small cell base station, on a utility pole, sidewall of a building or other location below the roofline. Thus, typically there is not a direct Line Of Sight (LOS) between an RBM and a hub.

According to system simulations with a typical wireless backhaul system setup, most of RBMs that are capacity challenged (0-3 b/s/Hz spectral efficiency) are in the sector-edge areas, which suffer from heavy intra-cell interference from a co-located hub. Typically, the percentage of these capacity-challenged RBMs is in the range of 15 to 25%. If the interference created by this group could be cancelled, the overall system capacity would be close to upper bound performance for a system with the frequency reuse of 3.

One approach to reducing the number of interference challenged RBMs is to use a dual carrier backhaul network instead of a single carrier network. By way of example operation of dual carrier systems is described, for example, in an article by Gora, J.; Redana, S., entitled "In-band and out-band relaying configurations for dual-carrier LTE-advanced system", 2011 IEEE 22nd International Symposium on Personal Indoor and Mobile Radio Communications (PIMRC), pp. 1820-1824, 11-14 Sep. 2011 and in an article by Gong, M. X.; Shiwen Mao; Midkiff, S. F., entitled "Load- and Interference-Aware Channel Assignment for Dual-Radio Mesh Backhauls", Global Telecommunications Conference, 2008. IEEE GLOBECOM 2008. IEEE, pp. 1-6, Nov. 30 2008-Dec. 4 2008.

To reduce or eliminate interference, a concept of joint scheduling can be utilized, to allow carrier hopping, in which an RBM is assigned to the carrier with a lower or zero interference level. Transmissions on different carrier frequencies usually exhibit different pathloss characteristics between the same pair of nodes. Different carrier frequencies generally have different spectrum usage characteristics, such as the amount of available bandwidth or transmit power masks, for example.

For dual-carrier fixed wireless backhaul networks, conventional dual carrier hardware, i.e. with a separate RF chain/separate RF front end and antenna system for each carrier, is typically not optimally used in all cell areas. There is a need for a practical scheme to more effectively use dual carrier hardware, and for systems and methods to reduce the number of link budget challenged and interference challenged RBMs in dual carrier backhaul networks, and/or to assign RBMs to different carrier frequencies and/or channels so as to achieve a given system design target.

Accordingly, an object of the present invention is to provide an improved or alternative method and system for joint scheduling in dual-carrier wireless networks and particularly for wireless backhaul solutions comprising fixed or stationary nodes with directional antennas, including small-cell Non-Line-Of-Sight (NLOS) backhaul networks.

SUMMARY OF INVENTION

Aspects of the present invention provide a method and system for joint scheduling in a dual-carrier wireless backhaul network.

One aspect of the invention provides a method of joint scheduling in a dual-carrier fixed wireless backhaul network comprising a plurality of nodes, each node comprising a plurality of Hub modules, each Hub module serving one or more remote backhaul modules (RBMs) through Hub-RBM radio links and operating with a primary carrier and a secondary or shared carrier, wherein the method comprises: for Hub modules and RBMs configured for dual-carrier operation using the primary carrier and the secondary carrier, and wherein the primary carrier is a licensed band and the secondary carrier is a lower cost shared band or an unlicensed band, providing a frame structure wherein control signaling messages are carried on the primary carrier; performing a network entry for each RBM on the primary carrier; and
performing carrier assignment wherein each Hub module transmits a broadcast frame on the primary carrier assigning each served RBM to the primary carrier or the secondary carrier.

For example, when the primary carrier is a licensed band and the secondary carrier is a an unlicensed band comprising a plurality of channels, the control signalling for RBMs assigned to the secondary shared carrier comprises a channel assignment and a fallback channel assignment or changes thereto.

The method may further comprise determining a transmission mode for each Hub-RBM link based on instantaneous channel conditions to optimize overall system performance across a network neighborhood and to meet RBM quality of service requirements.

Thus Dual Carrier Joint Scheduling (DCJS) is implemented using a control plane on the primary carrier for efficient and robust control. That is, control signalling messages for RBMs operating on either the primary and secondary carriers are always carried by the primary carrier.

Another aspect of the invention provides a method of joint scheduling in a dual-carrier fixed wireless backhaul network comprising a plurality of nodes, each node comprising a plurality of Hub modules, each Hub module serving one or more remote backhaul modules (RBMs) through Hub-RBM radio links and operating with a primary carrier and a secondary carrier, wherein the method comprises:
in an initialization phase:
 performing Hub-RBM clustering comprising associating each RBM to a respective serving Hub; and for Hubs and/or RBMs having one or more beams, performing Hub-beam selection and RBM-beam selection for each Hub-RBM radio link;
 obtaining initial performance metrics, including pathloss information, for Hub-RBM radio links between each RBM and its respective serving Hub using the primary carrier, and storing said performance metrics for each Hub-RBM link in a centralized processing unit;
in a data collection phase:
for Hub-RBM links for each Hub and respective served RBMs of at least part of the network (neighborhood):
 a) obtaining a performance metric and computing a utility gain for each of a plurality of time slot assignments on the primary carrier;
 b) obtaining a performance metric and computing a utility gain for each of a plurality of time slot assignments on the secondary carrier and for each channel of the secondary carrier;
in a parameter selection phase:
 c) storing in the centralized processing unit, tables (maps) of utility gain values from steps a) and b) and computing therefrom a maximum achievable sum utility over the neighborhood;
 d) selecting for each RBM
  a time slot of the primary carrier; or
  a time slot of the secondary carrier;
  to optimize the sum utility over the neighborhood;
in a parameter application phase:
 e) scheduling each RBM to the selected carrier and time slot; and
 f) for each Hub-RBM radio link, selecting a transmission mode and a modulation and coding scheme (MCS) based on instantaneous channel conditions and to meet an RBM quality of service requirement.

A plurality of n-subframes (time slots) are provided on each of the primary and secondary carrier. Carrier and slot assignments are selected to optimize the sum utility on a per-neighborhood basis, i.e. for a set of Hub-RBM links of a neighborhood comprising: one Hub (sector); or one site comprising a plurality of co-located Hubs; or across a neighborhood comprising multiple sites of the network; or over the entire network. Scheduling is coordinated by a centralized server or processing unit which communicates with each Hub. Preferably, performance metrics, carrier assignments and slot assignments are communicated between Hubs and their served RBMs using control signaling on the primary carrier. These data are shared amongst Hubs of each site and communicated between Hubs and the centralized server. The centralized server maintains tables or maps of performance metrics for each Hub-RBM link for look-up in a centralized processing unit, and tables or maps showing with listings of which RBMS are assigned to the primary carrier and which RBMs are assigned to the secondary carrier, together with channel assignments on the secondary carrier.

In a preferred embodiment, the primary carrier is a licensed carrier and the secondary carrier is an unlicensed or lower costs shared carrier. RBMs are assigned to the primary carrier based on performance metrics on the primary carrier, e.g. RBMs having a performance metric above a threshold are assigned to the primary carrier. For example, performance metrics are obtained by performing Radio Frequency Environmental Characteristics (RFEC) measurements to generate an RFEC table or interference map having entries for each Hub-RBM radio link of the network which is maintained by the centralized server. RBMs having a performance metric above a performance threshold, such as a spectral efficiency above a threshold value, are assigned to the primary carrier. Other RBMs, i.e. interference challenged RBMs, are then assigned to the secondary carrier.

Performance metrics are then obtained for each RBM assigned to the secondary carrier for each time slot and for each channel of the secondary carrier. RBMs on the secondary carrier are then assigned to a slot and channel of the secondary carrier based on channel availability. A table is generated and stored by the centralized server with a list of RBMs assigned to the primary carrier. Another table is generated and stored by the centralized server with a list of RBMs assigned to the secondary carrier. The latter table also provides an RBM specific channel assignment.

The assignment of RBMs to carriers is not rigid and can be changed dynamically, i.e. DCJS uses a frequency hopping frame structure. Preferably, a fallback channel on the secondary carrier is assigned to each RBM.

For example, after carrier assignment, the service level agreement for each RBM is verified, and if additional resources are available in the secondary carrier, these may be assigned. The second carrier assignment assigns specific channels to each RBM but does not necessarily specify the number of sub-frames (time slots) to schedule for each RBM. However, for tighter scheduling, with zone coordination, specific time sub-frames or time slots are indicated by a sub-frame index for a specific channel assignment on the second carrier.

The control channel is always on the primary carrier and the primary carrier control channel carries messages signalling the secondary channel and fall back channel assignment changes.

In the initialization step, obtaining performance metrics may comprise retrieving stored metrics from prior measurements, i.e. obtained from earlier Radio Frequency Environmental Characteristics (RFEC) measurements, or by performing RFEC measurements for each Hub-RBM link or for a set of Hub-RBM links and storing updated RFEC tables of performance metrics. Initialization steps may further comprise clustering of a set of RBMs to a respective serving Hub or updating clustering of RBMs to serving Hubs.

In the case that Hubs comprise multi-beam Hubs, the initialization step may further comprise performing Hub beam selection based on said RFEC measurements, and/or Hub-beam selection may be performed dynamically with subsequent joint scheduling steps.

In the case that RBMs comprise multimode RBMs, joint scheduling may further comprise RBM mode selection, as described in the above referenced related co-pending application.

The method of joint scheduling can include, for example, determining the link quality of each RBM-Hub link on the primary and secondary carriers, and then determining the link quality of each RBM-Hub link on different channels of the secondary carrier. Additionally, the method can include determining a primary channel and a fallback channel on the secondary carrier.

Joint scheduling includes a control channel, active on the primary carrier. The information carried by the control channel includes signalling messages for both the primary and secondary carriers. The signalling messages for the secondary carrier may include a primary channel and fallback channel assignment changes.

Another aspect of the invention provided a system for joint scheduling in a dual-carrier fixed wireless backhaul network comprising a plurality of nodes, wherein each node comprises plurality of Hub modules, each Hub module serving one or more remote backhaul modules (RBMs) through Hub-RBM radio links and operating with a primary carrier and a secondary carrier, the system comprising a centralized server or centralized processing unit for coordinating joint scheduling across the network.

Advantageously, the system comprises a centralized server or processing unit, that provide for DJCS algorithms to be implemented across the entire network, across a neighborhood comprising a plurality of sites, on a per site basis for a plurality of co-located Hubs, or on a per sector basis.

When DCJS is carried out for a small neighbourhood comprising a single site or a single sector, a processing unit of each respective Hub performs measurements of metrics, communicates performance metrics and other data to the centralized server to storage and look-up and optionally shares data directly with other Hubs of the site.

The centralized server stores performance metrics for each Hub-RBM radio link for look-up and coordinates obtaining performance metrics for each Hub-RBM radio link, e.g. by RFEC measurements. The centralized server or processing unit also coordinates clustering of RBMs to a serving Hub, and optionally, when the Hubs comprise multi-beam Hubs, coordinates Hub-beam selection.

Thus when the primary carrier comprises a licensed band and the secondary carrier comprises an unlicensed band or low cost shared carrier, a frequency hopping dual carrier system comprises a centralized server, or processing unit, for coordinating joint scheduling and channel assignment to enable virtual frequency reuse of 1 in which f0 is the primary carrier and f1, f2 . . . fm are channels of the secondary carrier. For example, n-subframes or time slots are provided on each of the primary and secondary carriers.

The centralized server coordinates:
a) obtaining a performance metric and computing a utility gain for each of a plurality of time slot assignments on the primary carrier;
b) obtaining a performance metric and computing a utility gain for each of a plurality of time slot assignments on the secondary carrier.

The centralized server stores, tables or maps of utility gain values from steps a) and b) and computes therefrom a maximum achievable sum utility over the neighborhood.
The centralized server then selects for each RBM
i) a time slot of the primary carrier; or
ii) a time slot of the secondary carrier;
to optimize the sum utility over the neighborhood and scheduling each RBM to the selected carrier and time slot.

Once the RBM-to-slot assignment is determined, the actual Modulation and Coding Scheme (MCS) used for an RBM in any of its scheduled slots depends on the instantaneous channel conditions and the buffer status of its traffic queue, which may vary from one superframe to another. Further description of modulation and coding schemes are provided in the above referenced related applications, e.g. "System and Method for Reception Mode Switching in Dual-Carrier Wireless Backhaul Networks".

The centralized server coordinates various specific algorithms for implementation of joint DCJS, e.g.:
per sector DCJS with fixed Hub-beam and channel assignments;
per site DCJS with fixed Hub-beam and channel assignment;
per neighborhood DCJS with fixed beam and channel assignment;
per network DCJS with fixed beam and channel assignment;
per sector, per site, per neighborhood or per network DJCS with Hub-beam selection and channel selection.

Thus, the centralized server is involved in interference detection and sensing, and coordination and implementation of carrier assignment, channel assignment, and resource assignment, which may include zone coordination or slot assignment.

Another aspect of the invention provides a computer readable storage medium, storing instructions, which when executed in one or more processing units of the backhaul network, implement steps of a method for dual carrier joint scheduling. The computer readable storage medium may be part of a centralized server or centralized processing unit of the network. In a distributed system, i.e. where processing is distributed between a processor of a central server and respective processors of one or more individual Hubs, the computer readable storage medium comprises, for example, storage media associated with processors of individual Hubs or sets of Hubs, storing instructions for local processing by a Hub of steps of the method, and then sharing data with other Hubs and/or the centralized processing unit.

System and methods according to embodiments of the invention provide a practical scheme for joint scheduling in dual-carrier fixed wireless backhaul systems. After an initial assignment of RBMs to primary and secondary carriers, the method may comprise dynamically re-assigning RBMs to carriers to improve system performance, for example to optimize performance metrics across a neighborhood, and/or to more effectively use available resources on the secondary carrier.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 3 shows schematically an example of a frame structure for implementing Dual Carrier Joint Scheduling in a dual-carrier wireless backhaul system according to an embodiment of the present invention;

FIG. 7A illustrates schematically an RBM-Hub association map;

FIG. 7B illustrates schematically assignment of RBMs to available resource slots of the primary (licensed) carrier and secondary (unlicensed) carriers;

DETAILED DESCRIPTION OF THE EMBODIMENTS

A system and method for joint scheduling and channel assignment in a wireless backhaul network will be described, by way of example, with reference to a NLOS wireless backhaul network 100 as illustrated schematically in FIG. 1, which represents schematically the topology of a system comprising a point-to-multipoint wireless backhaul network, comprising a plurality of fixed nodes. The nodes comprise a plurality of Hubs 102 and RBMs 104.

Figure 1:
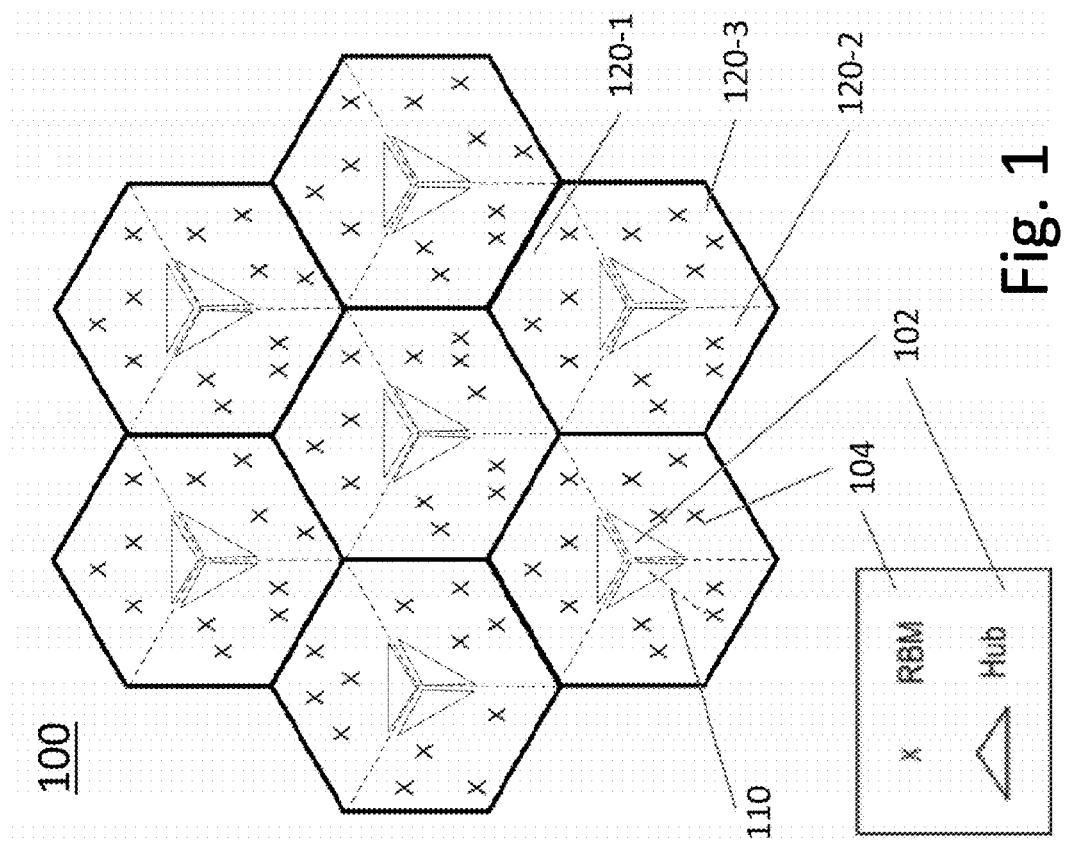
FIG. 1 shows a schematic diagram of a wireless backhaul network comprising a plurality of Hubs, each Hub serving a plurality of Remote Backhaul Modules (RBMs) for implementing a method for Dual Carrier Joint Scheduling (DJCS) according to an embodiment of the present invention.

As an example only, the wireless backhaul network 100 shown in FIG. 1 comprises a plurality of seven sites or cells, each site comprising three Hub modules 102, with each Hub module serving a sector 120 comprising a cluster of a plurality of Remote Backhaul Modules (RBMs) 104. Thus, there are 21 sectors, each with a Hub module 102, serving a cluster of up to four RBMs. As shown, three Hub modules 102, each with directional antenna, are co-located in each of the cell centers, with a cluster of RBMs mapped to each respective serving Hub, in each of the three sectors 120-1, 120-2, 120-3 of the cell.

Figure 2:
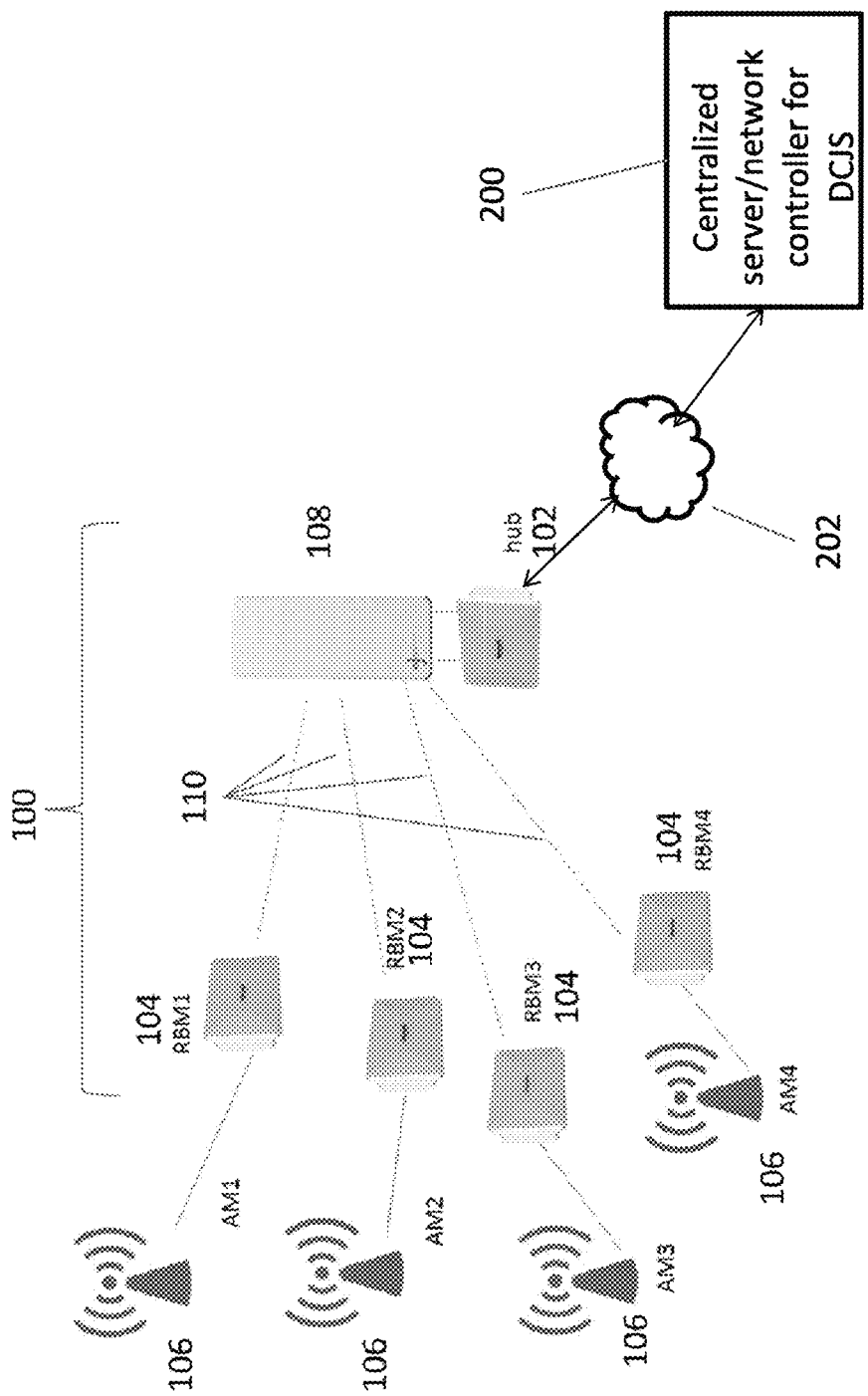
FIG. 2 shows a schematic diagram of part of the wireless backhaul network comprising one cluster of four RBMs served by a Hub module, each RBM being connected to an access module of an access network, and wherein the Hub has a connection to a centralized control server for coordinating DJCS across the network.

In each sector 120, a Hub module 102 serves its set or cluster of Remote Backhaul Modules (RBMs) 104 through wireless links, i.e. Hub-RBM radio links 110, as shown schematically in FIG. 2. Each RBM 104 communicates with and is co-located with an Access Module (AM) 108 of an access network, such as a small cell-base station, using a wired connection, e.g. an Ethernet cable. The Hub module 102 may have a multi-beam antenna 108 and RBMs 104 each have an integrated directional antenna that is directed towards the Hub. Unlike a multi-hop architecture, each radio link 110 comprises only one hop from each RBM 104 to a respective Hub to carry the traffic. It is also different from the relay system where the access links and relay links share the same radio frequency band. The backhaul network operates at a different frequency band from that of the access network. Also shown in FIG. 2 is a communications link 202 from the Hub 102 to a centralized server or controller 200, for managing control functions of the wireless backhaul network.

Conventionally, as described in the above referenced related U.S. patent applications, the wireless backhaul network is operated using a single carrier, i.e. a licensed band, and the frequency reuse factor of the system is 1. In a wireless backhaul network according to embodiments of the present invention, the system is operated with dual carriers comprising a primary carrier and a secondary carrier. The primary carrier is a licensed band and preferably the secondary carrier is an unlicensed band or other lower cost, shared frequency band. The secondary carrier may comprise one or more channels. Where the secondary channel has n channels, a method for Dual Carrier Joint Scheduling (DCJS) is provided in which f0 is the primary carrier, and f1, f2 . . . fm, are virtual channels of the secondary carrier, i.e. unlicensed band. This scheme provides a virtual frequency reuse of 1.

In a wireless NLOS backhaul network, the goal of joint scheduling is to optimize the system performance by proper carrier and channel assignment to each RBM. The performance of an RBM is generally governed by its achievable throughput, which is a function of the amount of allocated bandwidth and its CINR. In essence, the Spectral Efficiency ($SE_{ij}$) on the jth channel of the ith carrier is a function of CINR, for instance $SE_{ij}=\log_2(1+CINR_{ij})$, where $CINR_{ij}$ is the received CINR on the jth channel of the ith carrier. The throughput on the jth channel of the ith carrier can be computed as follows: $Thpt_{ij}=W_{ij}SE_{ij}$, where $W_{ij}$ is the amount of allocated bandwidth on the jth channel of the ith carrier, and $CINR_{ij}$ is the received CINR on the jth channel of the ith carrier.

In a dual-carrier wireless backhaul system, comprising a primary licensed band and a secondary unlicensed band, the procedure of joint scheduling comprises channel measurement of an appropriate performance metric, carrier assignment, channel assignment, and resource allocation.

An RBM is first associated to its serving Hub based on a predefined metric, such as distance, or other method of clustering RBMs to a serving Hub. On the primary carrier, a performance metric, e.g. the channel quality for each RBM-to-Hub radio link is measured and populated into a lookup table, referred to as Radio Frequency Environment Characteristics (RFEC) table or matrix. Methods for channel quality measurement are described in related U.S. patent application Ser. No. 13/230,368, filed on Sep. 12, 2011, entitled "System and Method for Co-Channel Interference Measurement and Managed Adaptive Resource Allocation for Wireless Backhaul". The latter application refers to the RFEC table as a "MARA Matrix". The RFEC table or RFEC matrix effectively provides an interference or performance map for all radio links of the wireless backhaul network, with each entry of the matrix representing a performance metric for a radio link between $Hub_i$ and $RBM_j$. The RFEC matrix is preferably stored in a centralized server 200, e.g. a network control server, which is in communication with each Hub. The centralized server manages joint scheduling and channel allocation across the wireless backhaul network. The centralized server may also manage power control or other functions. To account for the changes in the network environments, channel quality measurements can be done on a periodic or regular basis, to update the RFEC table (MARA Matrix) as required.

Based on the channel quality measurements, e.g. measurement of pathloss or channel gain for each Hub-RBM radio link ij, the received CINR of each RBM is estimated and hence an estimated spectral efficiency is computed. Assignments of each RBM to the primary or secondary carrier, is made based on the computed spectral efficiencies Sij for each Hub-RBM radio link ij.

Various algorithms or schemes may be used for implementing DCJS based on the computed spectral efficiencies. For example, RBMs with poor spectral efficiencies, which have good channel gains with respect to their interfering Hubs, are assigned to the secondary carrier, and the rest of the RBMs are assigned to the primary carrier. In another example, RBMs with good channel gains with respect to their serving Hubs are assigned to the secondary carrier, and the rest of the RBMs are assigned to the primary carrier.

In the case where multiple channels are available in the secondary (unlicensed) carrier, each RBM performs spectrum sensing to detect the interference-plus-noise floor. An interference table, with values for each link (RFEC table) is populated and stored in the centralized server. The centralized server then executes a channel assignment algorithm to allocate channels to RBMs, one of which is the main channel for data transmission over the secondary carrier, while the remaining channels become fallback channels in the case when the main channel is not available or cannot be used.

For example, in one implementation, a channel assignment metric is a function of both foreign-interference power levels (i.e. interference from other nodes that are not part of the same network, but transmit on the same frequency band) and the proximity of RBMs. In another implementation, the centralized server determines a channel hopping strategy for an RBM according to its main channel and its fallback channels.

After the carrier assignment and the channel assignment, the centralized server then assigns bandwidth to each RBM for data transmission. Other resource allocation algorithms such as power control can also be triggered to improve or optimize system performance.

Part or the entire process of joint scheduling can be repeated to achieve better system performance. For instance, some RBMs that are on the primary carrier can hop to the secondary carrier if there are bandwidth and channels available in the secondary carrier.

To enable efficient joint scheduling, the control channel is implemented on the primary carrier. RBMs that are on either the primary or secondary carrier switch to the primary carrier to retrieve control signalling messages.

FIG. 3 shows an example of a Frame Structure which may be used to implement DCJS. A frame comprises one or more sub-frames or time slots, and each slot is assigned to an RBM. As illustrated schematically, for frames for each of the Primary and Secondary carrier, each frame has 4 sub-frames of 1ms duration on each frequency channel (dimension). Downlink (DL) and uplink (UL) transmissions share a slot and operate in a time-division duplex (TDD) manner. The DL/UL transmissions are synchronized in the primary and secondary carriers. That is, the downlink (DL) and uplink (UL) for each sub-frame are always synchronized. Any of the 8 sub-frames, or groups of sub-frames might be assigned to any RBM in a cluster. Any of the 4 sub-frames of the secondary carrier can be transmitted on a different frequency.

Figure 4:
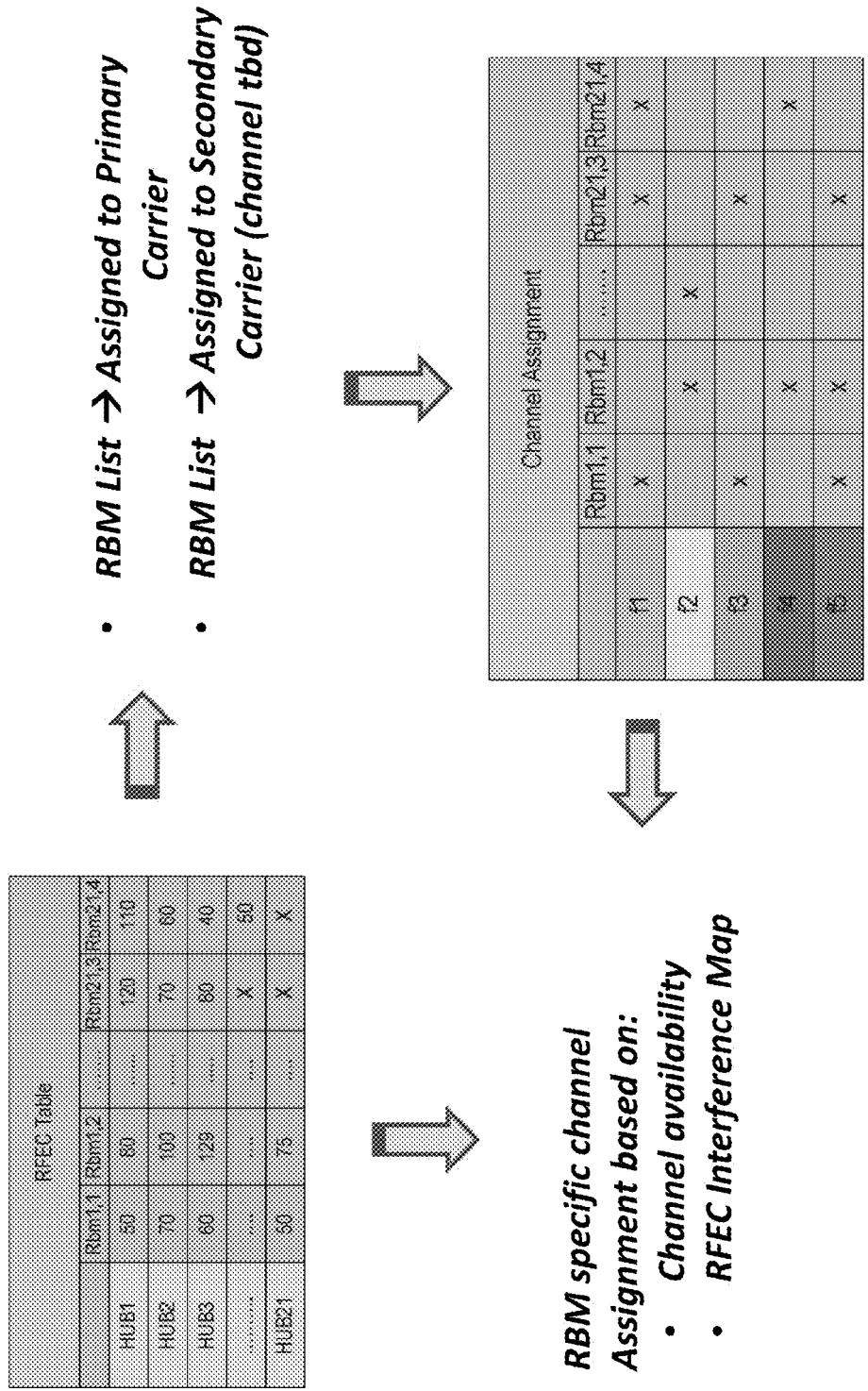
FIG. 4 illustrates schematically an RFEC Interference map (RFEC table) and a Channel assignment table for implementation of dual carrier joint scheduling according to an embodiment of the invention.
Figure 5:
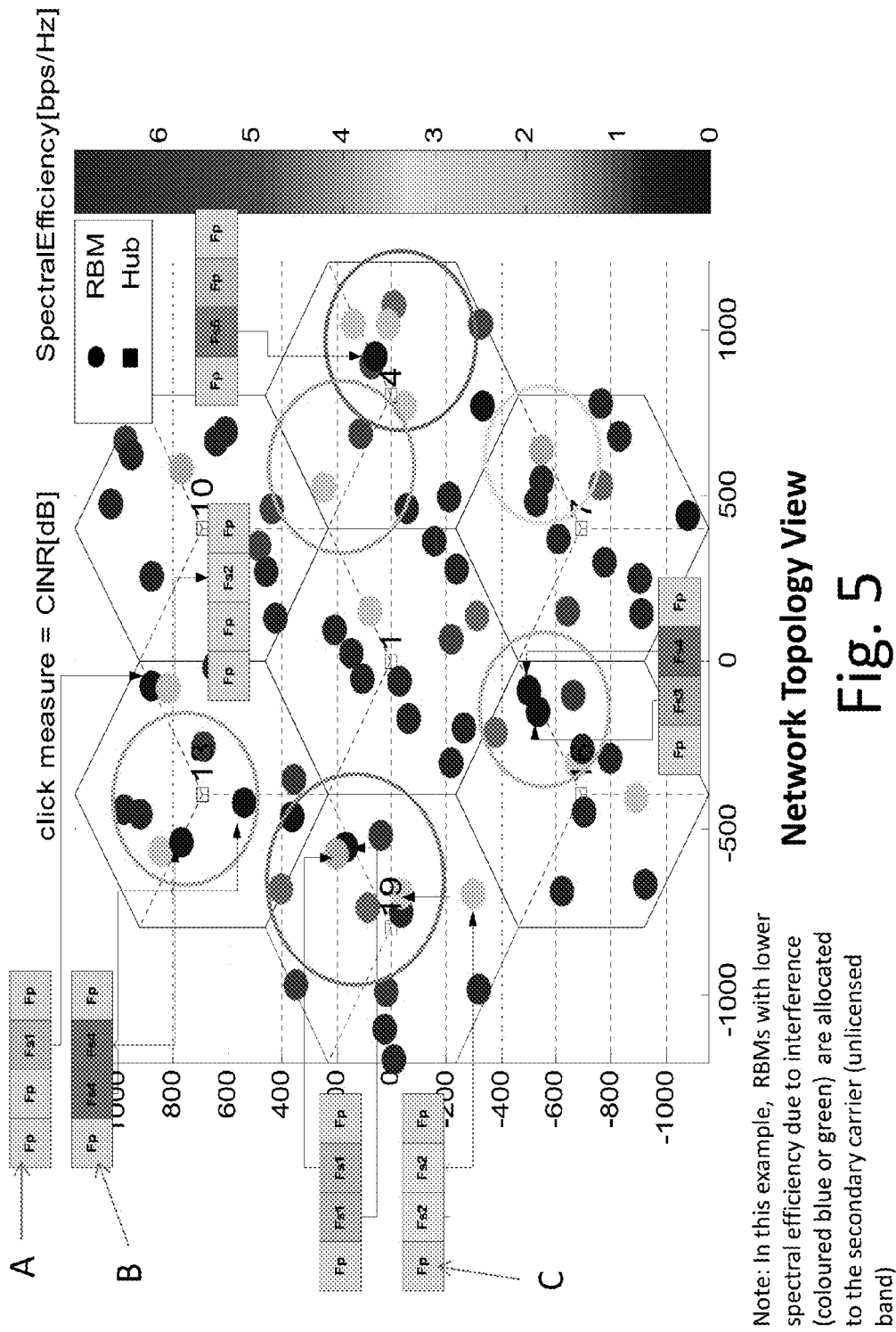
FIG. 5 illustrates schematically a wireless backhaul network topology similar to that shown in FIG. 1, in which the spectral efficiency for each RBM on the primary channel is indicated by a colour mapping and in which channel allocations for some RBMs to secondary channels are indicated to provide improved spectral efficiency.

FIG. 5 illustrates schematically implementation of a DCJS method for RBM resource assignment. The centralized server 200 stores the RFEC table of metrics 204 for each Hub-RBM radio link (see FIG. 4). The centralized server 200 also maintains a database 206 of RBMs on the primary and secondary carriers. A table of channel assignments 208 on the secondary carrier (FIG. 4) is also stored in the centralized server. The table of channel assignments includes a primary channel and one or more fallback channels are also recorded. The server 200 communicates the carrier and channel assignments to the Hubs.

Each Hub communicates the carrier and channel assignments to its served RBMs using control signalling messages transmitted on the primary carrier, using a special broadcast frame. That is, each Hub broadcasts a frame on the primary carrier comprising control signalling messages scheduling each served RBM to the primary or secondary carrier and a time slot. For example, as illustrated schematically in FIG. 5, RBMs with lower spectral efficiency due to interference (coloured blue or green) are allocated to the secondary carrier (unlicensed band).

For site or cell 13, for example, there are two sectors with interference challenged RBMs.

For one sector, to schedule $RBM_3$ (dark blue) to the secondary carrier and channel 1, frame A has the form:

| Fp | Fp | Fs1 | Fp |
|---|---|---|---| where Fp indicates assignment of first, second and fourth RBMs to the primary carrier and Fs1 indicated assignment of the third RBM to the secondary carrier, channel 1.
For the neighboring sector, to schedule second and third interference challenged RBMs to the secondary carrier and channel 4, frame B has the form:

| Fp | Fs4 | Fs4 | Fp |
|---|---|---|---| where Fp indicates assignment to the primary carrier of first and fourth RBMs and Fs1 indicates assignment of second and third RBMs to the secondary carrier, channel 1.
As mentioned above, the control signalling messages are broadcast on the primary carrier and each RBM must switch to the primary carrier to receive these messages.

After assignment is completed for each RBM, the service level agreement (SLA) for each RBM is verified. If additional resources are left in the secondary carrier (unlicensed band) these resources can be assigned. For example, for site/cell 19 illustrated schematically in FIG. 5, one sector has two RBMs colored orange. While these RBMs may not be unacceptably interference challenged, these two RBMs are assigned to the secondary carrier, channel 2, as indicated by Frame C,

| Fp | Fs2 | Fs2 | Fp |
|---|---|---|---|

These assignments are not rigid and can be changed dynamically, if required, based on instantaneous channel conditions. Preferably, each RBM would have a default or "fallback" channel of the secondary carrier. The assignment need not necessarily specify the number of sub-frames to schedule for each RBM, but the assignment does provide specific channels that a particular RBM is allowed to use. In the case that tighter joint scheduling is required, with zone-coordination, a position index of the sub-frame is also specified with the channel assignment.

The control channel is always on the primary carrier and carries messages signalling secondary channel and fall back channel assignment changes, and optionally also carries the position index when zone coordination is implemented.

Once the RBM-to-slot assignment is determined, the Hub-RBM transmission mode, including the RBM receive and transmit modes using an assigned primary or secondary carriers and the actual Modulation and Coding Scheme (MCS) used for an RBM in any of its scheduled slots depends on the instantaneous channel conditions and the buffer status of its traffic queue, which may vary from one superframe to another. Further description of modulation and coding schemes is provided in the related application entitled "System and Method for Reception Mode Switching in Dual-Carrier Wireless Backhaul Networks". For example, for multimode RBMs, with resource borrowing of RF chains, the RBM mode selection may comprise selection of a first or second beamformer (beam selection module) for operation on a respective first or second carrier comprising Interference Rejection Combining (IRC) or Maximal Radio Combining (MRC).

For example, available RBM reception modes may include:
MIMO Dual Carrier operation for no interference environments and good link connections for both carriers.
MIMO Single Carrier with an IRC algorithm for high interference environments.
MIMO Single Carrier with an MRC algorithm for better performance while only one carrier can be used.

Figure 10:
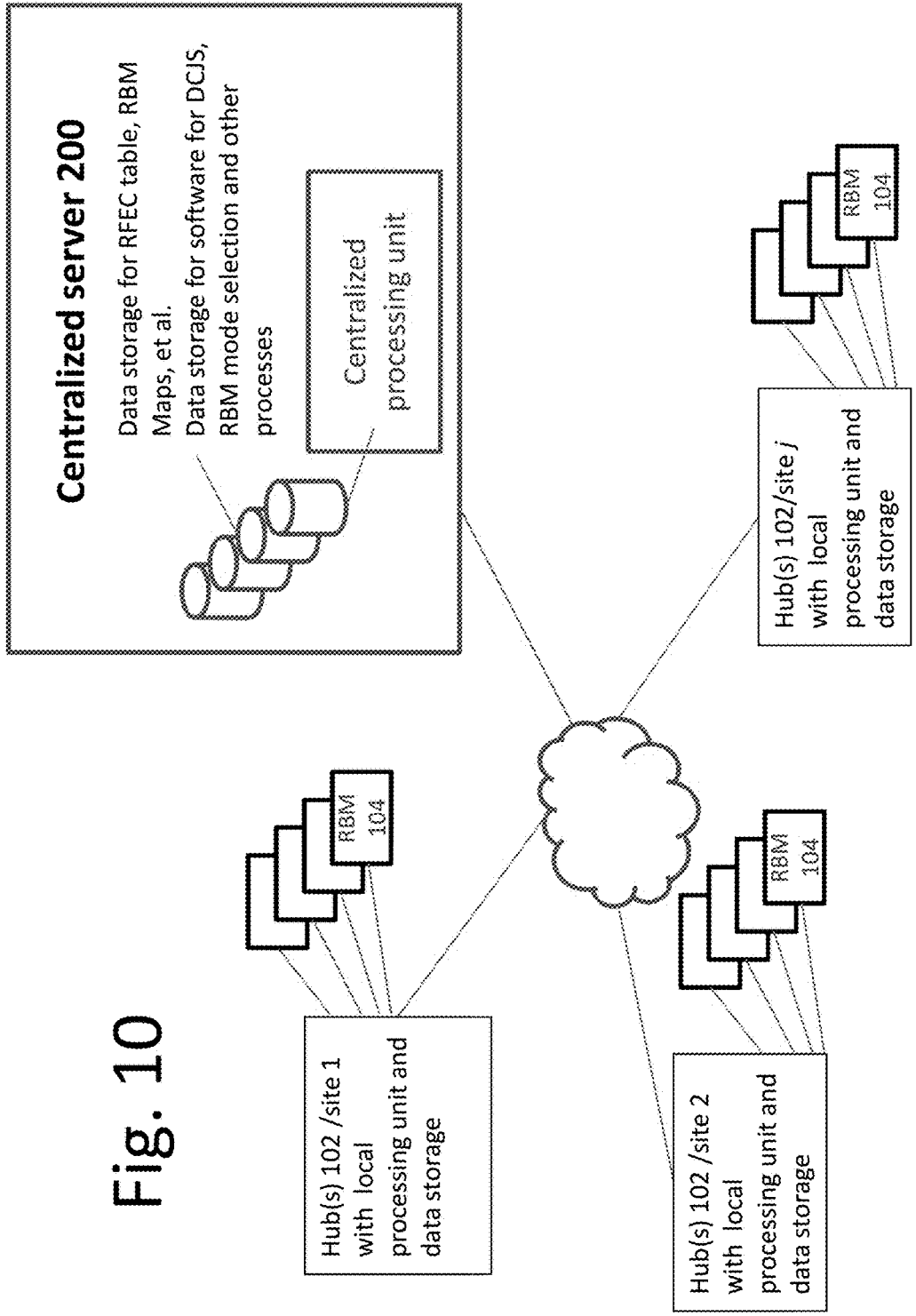
FIG. 10 represents a simplified schematic of elements of a system comprising a central control server for implementing DCJS.

FIG. 10 illustrates schematically a simplified block diagram of elements of the centralized server 200 which comprises a processor that is programmed or configured to implement a method for DCJS, according to an embodiment of the invention. As described above, each Hub also comprises a local processing unit and data storage for controlling communications with its served RBMs, and sharing information with co-located Hubs. The centralized server is in communication with all Hubs and comprises storage for network information relating to performance management, e.g. the RFEC table, RBM Maps, et al. for all sites of the network, and data storage for software instructions for implementing DCJS, RBM mode selection and other processes and coordinating processes across the entire network.

For example, each processing unit may include central processing unit (CPU), memory, mass storage device, video adapter, and I/O interface connected to a bus. The bus may be one or more of any type of several bus architectures including a memory bus or memory controller, a peripheral bus, video bus, or the like. CPU may comprise any type of electronic data processor. Memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs. The mass storage device may comprise any type of storage device configured to store data, programs, and other information and to make the data, programs, and other information accessible via the bus. Mass storage device may comprise, for example, one or more of a solid state drive, hard disk drive, a magnetic disk drive, an optical disk drive, or the like. The video adaptor and the I/O interface provide interfaces to couple external input and output devices to the processing unit. The processing unit also includes one or more network interface, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Accordingly, DCJS may be implemented on a per-neighborhood basis, i.e. across multiple sites, or across the entire wireless backhaul network as required. It may be implemented with a fixed Hub-beam and channel assignment, or with Hub-beam selection and/or channel assignment. Alternatively, DCJS may be implemented locally, e.g. on a per-sector or per-site basis. By way of example, several examples for local implementation will now be described in more detail.

EXAMPLE 1

Per-Sector Joint Scheduling with Fixed Beam and Channel Assignment

In this embodiment, the method comprises independently executing dual carrier joint scheduling (DCJS) for each sector or Hub. The following steps are carried out before DCJS:

Clustering-associating Hubs to RBMs (clustering)

Hub Beam selection-each Hub selects one of the Hub beams to communicate with.

RBM beam selection-each RBM selects one of the RBMs beams to communicate with its serving Hub.

Channel selection-each RBM selects one of the channels in the secondary carrier.

The number of sub-frames to be scheduled in every scheduling interval is T, which determines how often the scheduler is executed. On execution, the RBM-to-sub-frame and carrier assignment is determined for the next T subframes. T (msec) should be less than the coherence time of the channel. An averaging window W is set, e.g. a default of W=100 sub-frames. Other features and constraints may include use of a multimode RBM, and a delay constraint such that $D_{target} \leq T$, and a committed rate requirement constraint.

DCJS then uses the following inputs:

Predicted RSSI of each RBM on the primary carrier: $RSSI_j^{(t)}$, $\forall j \in S_i$, $\forall t \in \{1, \ldots, T\}$ These RSSI measurements are used from the previous T subframes The RSSI measurement includes the aggregate energy, which includes the signal received from the serving hub, interference, and noise. The RSSI measurement is used by the Hub to calculate CINR.

Predicted RSSI of each RBM on the secondary carrier: $RSSI_{uc,j}^{(t)}$, $\forall j \in S_i$, $\forall t \in \{1, \ldots, T\}$ These RSSI measurements are used from the previous T subframes The RSSI measurement includes the aggregate energy, which includes the signal received from the serving hub, interference, and noise. The RSSI measurement is used by the Hub to calculate CINR.

Path-loss from the serving hub i to each RBM j for each beam in the primary carrier: $PL_{ij}^{(b)}$, $\forall j \in S_i$, $\forall b \in \{1, \ldots, N_b\}$ Path-loss from the serving hub i to each RBM j for each channel in the secondary carrier: $PL_{ij}^{(c)}$, $\forall j \in S_i$, $\forall c \in \{1, \ldots, N_c\}$ The beams used by each hub in the previous scheduling interval:

Previous_HubBeam$_i^{(t)}$, $\forall t \in \{1, \ldots, T\}$.

The channels used by each hub in the previous scheduling interval:

Previous_Channel$_{uc,i}^{(t)}$, $\forall t \in \{1, \ldots, T\}$.

Average rate of each RBM $\bar{R}_j$, $\forall j \in S_i$

We need memory to store $\bar{R}_j$, $\forall j \in S_i$

When the system boots-up, it sets $\bar{R}_j = \epsilon$, $\forall j \in S_i$, where $\epsilon$ is a very small number, in order to avoid dividing by zero in the algorithm.

$b_j$, $\forall j \in S_i$: hub-beam to be used to communicate with each RBM in the primary carrier $c_j$, $\forall j \in S_i$: frequency channel to be used to communicate with each RBM in the secondary carrier.

The following outputs are generated:

The RBM id of the RBM associated to Hub i and scheduled in subframe t in the licensed band: RBMMap$_i^{(t)}$, $\forall t \in \{1, \ldots, T\}$ The RBM id of the RBM associated to Hub i and scheduled in subframe t in the unlicensed band: RBMMap$_{uc,i}^{(t)}$, $\forall t \in \{1, \ldots, T\}$ The hub-beam antenna used by Hub i in subframe t in the licensed band:

HubBeam$_i^{(t)}$, $\forall t \in \{1, \ldots, T\}$

The Channel id of the channel selected by Hub i in subframe t in the unlicensed band:

Channel$_{uc,i}^{(t)}$, $\forall t \in \{1, \ldots, T\}$

Figure 6:
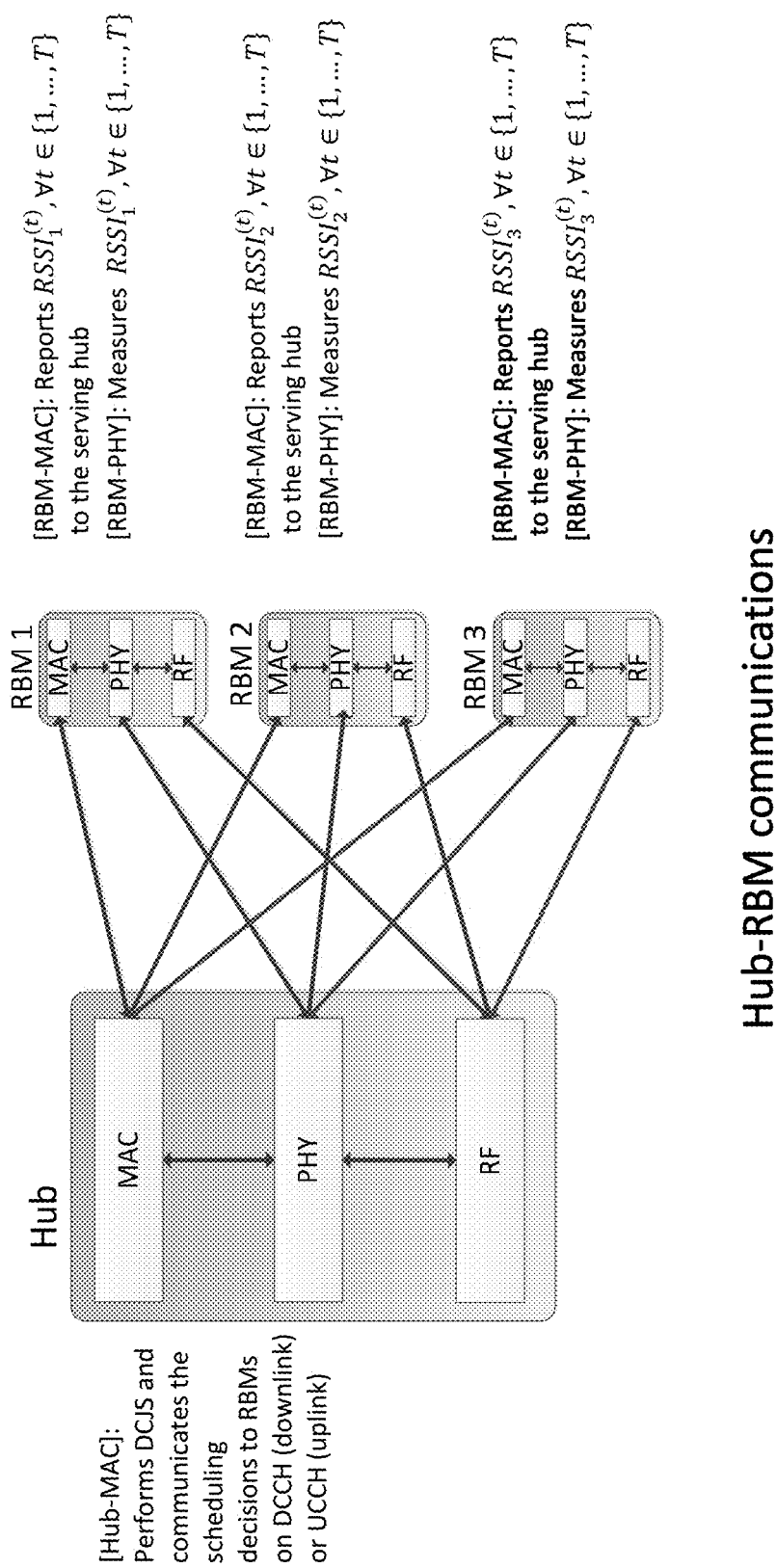
FIG. 6 illustrates schematically communications between one Hub and three RBMs served by the Hub for Dual Carrier Joint Scheduling.

FIG. 6 illustrates, schematically, communications between three RBMs and their serving Hub during implementation of DCJS. The Hub-MAC performs the DCJS and communicates the scheduling to each RBM on the DCCH (downlink control channel) or UCCH (uplink control channel).

More specifically, during initialization the CINRs are calculated for the primary carrier CINR$_j^{(t)}$ and secondary carriers CINR$_{uc,j}^{(t)}$ Calculate CINRs:

$$CINR_j^{(t)} = \frac{P_i\left(PL_{ij}^{(b_j)}\right)^{-1}}{\Gamma P_i\left(PL_{ij}^{(b_j)}\right)^{-1} + RSSI_j^{(t)} - P_i\left(PL_{ij}^{(Previous\_HubBeam_i^{(t)})}\right)^{-1}},$$

$$CINR_{uc,j}^{(t)} = \begin{cases} \dfrac{P_{uc,i}\left(PL_{uc,ij}^{(c_j)}\right)^{-1}}{\Gamma P_{uc,i}\left(PL_{uc,ij}^{(c_j)}\right)^{-1} + RSSI_{uc,j}^{(t)} - P_i\left(PL_{uc,ij}^{(c_j)}\right)^{-1}}, & \text{Previous\_Channel}_{uc,i}^{(t)} = c_j, \\ \dfrac{P_{uc,i}\left(PL_{uc,ij}^{(c_j)}\right)^{-1}}{\Gamma P_{uc,i}\left(PL_{uc,ij}^{(c_j)}\right)^{-1} + RSSI_{uc,j}^{(t)}}, & \text{Previous\_Channel}_{uc,i}^{(t)} \neq c_j. \end{cases}$$

Then respective average rates are calculated:

Calculate $R_j^{(t)}$ using MSC table and CINR$_j^{(t)}$, $\forall j \in S_i$, $\forall t \in \{1, \ldots, T\}$ Calculate $R_{uc,j}^{(t)}$ using MSC table and CINR$_{uc,j}^{(t)}$, $\forall j \in S_i$, $\forall t \in \{1, \ldots, T\}$ For each of the primary and secondary carriers, tables or RBM Map of the RBM associated with Hub i and scheduled in subframe t are generated and stored RBMMap$_i^{(t)}$=0, $\forall t \in \{1, \ldots, T\}$ RBMMap$_{uc,i}^{(t)}$=0, $\forall t \in \{1, \ldots, T\}$ Also stored is the Hub-beam antenna used by Hub i in subframe t HubBeam$_i^{(t)}$=0, $\forall t \in \{1, \ldots, T\}$ And the channel id of the channel selected by Hub I in sub-frame t in the secondary (unlicensed) carrier Channel$_{uc,i}^{(t)}$=0, $\forall t \in \{1, \ldots, T\}$ Execution: RBMMap$_i$, RBMMap$_{uc,i}$ are used to determine those RBMs which are not scheduled in either carriers, for each subframe, i.e. while there exists t such that RBMMap$_i^{(t)}$=0 OR RBMMap$_{uc,i}^{(t)}$=0
  Update R$_j^{(t)}$ and R$_{uc,j}^{(t)}$ ∀j∈S$_i$, ∀t∈{1, . . . , T}
  The rates for those RBMS are updated based on the RBM mode selected.
  Metrics Computation:
    Compute Metrics$_j^{(t)}$, Metrics$_{uc,j}^{(t)}$, ∀j∈S$_i$, ∀t∈{1, . . . , T} as follows $$\text{Metrics}_j^{(t)} = \begin{cases} \dfrac{R_j^{(t)}}{\bar{R}_j}, & \text{RBMMap}_{i=\text{Hub}_j}^{(t)} = 0, \\ -1, & \text{otherwise.} \end{cases}$$

$$\text{Metrics}_{uc,j}^{(t)} = \begin{cases} \dfrac{R_{uc,j}^{(t)}}{\bar{R}_j}, & \text{RBMMap}_{uc,i=\text{Hub}_j}^{(t)} = 0, \\ -1, & \text{otherwise.} \end{cases}$$

Schedule one user at a time:

--- max$_{Metrics}$ = max$_{j\in S_i, t\in\{1,...,T\}}$ Metrics$_j^{(t)}$
max$_{Metrics,uc}$ = max$_{j\in S_i, t\in\{1,...,T\}}$ Metrics$_{uc,j}^{(t)}$
If max$_{Metrics}$ > max$_{Metrics,uc}$
  (j*, t*) = arg max$_{j\in S_i, t\in\{1,...,T\}}$ Metrics$_j^{(t)}$
  RBMMap$_i^{(t*)}$ = j*
  HubBeam$_i^{(t*)}$ = b$_{j*}$
  $\bar{R}_j = \left(1 - \dfrac{1}{W}\right)\bar{R}_j + \dfrac{1}{W}R_j^{(t)}$
Else If max$_{Metrics}$ < max$_{Metrics,uc}$
  (j*, t*) = arg max$_{j\in S_i, t\in\{1,...,T\}}$ Metrics$_{uc,j}^{(t)}$
  RBMMap$_{uc,i}^{(t*)}$ = j*
  Channel$_{uc,i}^{(t*)}$ = c$_{j*}$
  $\bar{R}_j = \left(1 - \dfrac{1}{W}\right)\bar{R}_j + \dfrac{1}{W}R_{uc,j}^{(t)}$
Else If max$_{Metrics}$ = max$_{Metrics,uc}$
  If Σ$_t$ I (RBMMap$_i^{(t)}$ = 0) ≥ I (RBMMap$_{uc,i}^{(t)}$ = 0)
    (j*, t*) = arg max$_{j\in S_i, t\in\{1,...,T\}}$ Metrics$_j^{(t)}$
    RBMMap$_i^{(t*)}$ = j*
    HubBeam$_i^{(t*)}$ = b$_{j*}$
    $\bar{R}_j = \left(1 - \dfrac{1}{W}\right)\bar{R}_j + \dfrac{1}{W}R_j^{(t)}$
  Else
    (j*, t*) = arg max$_{j\in S_i, t\in\{1,...,T\}}$ Metrics$_{uc,j}^{(t)}$
    RBMMap$_{uc,i}^{(t*)}$ = j*
    Channel$_{uc,i}^{(t*)}$ = c$_{j*}$
    $\bar{R}_j = \left(1 - \dfrac{1}{W}\right)\bar{R}_j + \dfrac{1}{W}R_{uc,j}^{(t)}$
End While

---

Referring to FIG. 7A, this shows the RBM-Hub association map for clustering of twelve RBMs: 1, 2 . . . 12, with their respective serving Hubs: Hub 1, Hub 2 and Hub 3. The RBMs are then assigned to slots and carriers such that a utility function is maximized. FIG. 7B shows the RBM-Hub association maps for the licensed carrier for the unlicensed carrier.

EXAMPLE 2

Per Site Joint Scheduling with Fixed Beam and Channel Assignment (RFEC Measurements Required)

Hubs that belong to the same site (cell) coordinate and execute DCJS jointly. Thus inputs similar to those used in Example 1 are needed for each Hub and RBM of site k. Each site comprises two or more Hubs. RFEC measurements per site are stored in a centralized server (MARA) server for look-up. The following steps are carried out before DCJS:

Clustering-associating Hubs to RBMs (clustering)

Hub Beam selection-each Hub selects one of the Hub beams to communicate with.

RBM beam selection-each RBM selects one of the RBMs beams to communicate with its serving Hub.

Channel selection-each RBM selects one of the channels in the secondary carrier.

Before calculating the CINRs are calculated for the primary carrier CINR$_j^{(t)}$ and secondary carriers CINR$_{uc,j}^{(t)}$ as in Example 1, the RBM maps for the primary and secondary carrier are initialized and the out of site interference plus noise is calculated.

RBMMap$_i^{(t)}$=0,∀i∈HubList$_k$,∀t∈{1, . . . , T}

RBMMap$_{uc,i}^{(t)}$=0,∀i∈HubList$_k$,∀t∈{1, . . . , T}

Out of site interference plus noise:

$$IN_j^{(t)} = RSSI_j^{(t)} - \sum_{\substack{i\in\text{HubList}_k, \\ i\notin\text{Hub}_j}} P_i\left(PL_{ij}^{(\text{Previous\_HubBeam}_i^{(t)})}\right)^{-1}$$

$$IN_{uc,j}^{(t)} = RSSI_{uc,j}^{(t)} - \sum_{\substack{i\in\text{HubList}_k, \\ i\notin\text{Hub}_j, \\ \text{Previous\_Channel}_{uc,i}^{(t)}=c_j}} P_{uc,i}\left(PL_{ij}^{(c_j)}\right)^{-1}$$

Calculate CINRs:

$$CINR_j^{(t)} = \dfrac{P_i\left(PL_{ij}^{(b_j)}\right)^{-1}}{\Gamma P_i\left(PL_{ij}^{(b_j)}\right)^{-1} + IN_j^{(t)}},$$

$$CINR_{uc,j}^{(t)} = \dfrac{P_{uc,i}\left(PL_{uc,ij}^{(c_j)}\right)^{-1}}{\Gamma P_{uc,i}\left(PL_{uc,ij}^{(c_j)}\right)^{-1} + IN_{uc,ij}^{(t)}}$$

Calculate R$_j^{(t)}$ using MSC table and CINR$_j^{(t)}$, ∀j∈S$_i$, ∀i∈HubList$_k$, ∀t∈{1, . . . , T}

Calculate R$_{uc,j}^{(t)}$ using MSC table and CINR$_{uc,j}^{(t)}$, ∀j∈S$_i$, ∀i∈HubList$_k$, ∀t∈{1 . . . , T}

Execution:

While there exists t such that RBMMap$_i^{(t)}$=0 OR RBMMap$_{uc,i}^{(t)}$=0

Update R$_j^{(t)}$ and R$_{uc,j}^{(t)}$ ∀j∈S$_i$, ∀t∈{1, . . . , T}:

Use RBMMap$_i$, RBMMap$_{uc,i}$ to determine those RBMs which are not scheduled in either carriers, for each subframe.

The rates for those RBMS are updated based on the RBM mode selected.

Metrics Computation:

Compute Metrics$_j^{(t)}$, Metrics$_{uc,j}^{(t)}$, $\forall j \in S_i$, $\forall t \in \{1, \ldots, T\}$ as follows $$\text{Metrics}_j^{(t)} = \begin{cases} \dfrac{R_j^{(t)}}{\overline{R}_j} - \displaystyle\sum_{\substack{l \in S_i, \\ \forall i \in \text{HubList}_k}} \dfrac{1}{\overline{R}_i} \dfrac{(CINR_l^{(t)})^2}{\Gamma + CINR_l^{(t)}} \quad RBMMap_{i=Hub_j}^{(t)} = 0, \\[2ex] \dfrac{P_{Hub_j} PL_{Hub_l l}^{(b_l)}}{P_{Hub_l} PL_{Hub_j l}^{(b_j)}}, \\[2ex] -\infty, \qquad\qquad\qquad\qquad\qquad \text{otherwise.} \end{cases}$$

$$\text{Metrics}_{uc,j}^{(t)} = \begin{cases} \dfrac{R_{uc,j}^{(t)}}{\overline{R}_j} - \displaystyle\sum_{\substack{l \in S_i, \\ \forall i \in \text{HubList}_k}} \dfrac{1}{\overline{R}_i} \dfrac{(CINR_{uc,l}^{(t)})^2}{\Gamma + CINR_{uc,l}^{(t)}} \quad RBMMap_{uc,i=Hub_j}^{(t)} = 0, \\[2ex] \dfrac{P_{uc,Hub_j} PL_{uc,Hub_l l}^{(c_l)}}{P_{uc,Hub_l} PL_{uc,Hub_j l}^{(c_j)}}, \\[2ex] -\infty, \qquad\qquad\qquad\qquad\qquad \text{otherwise.} \end{cases}$$

Schedule one user [RBM] at a time:

---

$\max_{\text{Metrics}} = \max_{j \in S_i, t \in \{1,\ldots,T\}} \text{Metrics}_j^{(t)}$
$\max_{\text{Metrics},uc} = \max_{j \in S_i, t \in \{1,\ldots,T\}} \text{Metrics}_{uc,j}^{(t)}$
If $\max_{\text{Metrics}} > \max_{\text{Metrics},uc}$
  $(j^*, t^*) = \arg\max_{j \in S_i, t \in \{1,\ldots,T\}} \text{Metrics}_j^{(t)}$
  $RBMMap_i^{(t^*)} = j^*$ $\overline{R}_j = \left(1 - \dfrac{1}{W}\right)\overline{R}_j + \dfrac{1}{W}R_j^{(t)}$ Else If $\max_{\text{Metrics}} < \max_{\text{Metrics},uc}$
  $(j^*, t^*) = \arg\max_{j \in S_i, t \in \{1,\ldots,T\}} \text{Metrics}_{uc,j}^{(t)}$
  $RBMMap_{uc,i}^{(t^*)} = j^*$ $\overline{R}_j = \left(1 - \dfrac{1}{W}\right)\overline{R}_j + \dfrac{1}{W}R_{uc,j}^{(t)}$ Else If $\max_{\text{Metrics}} = \max_{\text{Metrics},uc}$
  If $\Sigma_t \, I\,(RBMMap_i^{(t)} = 0) \geq I\,(RBMMap_{uc,i}^{(t)} = 0)$
    $(j^*, t^*) = \arg\max_{j \in S_i, t \in \{1,\ldots,T\}} \text{Metrics}_j^{(t)}$
    $RBMMap_i^{(t^*)} = j^*$ $\overline{R}_j = \left(1 - \dfrac{1}{W}\right)\overline{R}_j + \dfrac{1}{W}R_j^{(t)}$ Else
    $(j^*, t^*) = \arg\max_{j \in S_i, t \in \{1,\ldots,T\}} \text{Metrics}_{uc,j}^{(t)}$
    $RBMMap_{uc,i}^{(t^*)} = j^*$ $\overline{R}_j = \left(1 - \dfrac{1}{W}\right)\overline{R}_j + \dfrac{1}{W}R_{uc,j}^{(t)}$

---

Update CINRs and Rates for subframe t*, $\forall i \in \text{HubList}_k$, $\forall j \in S_i$:

$$CINR_j^{(t^*)} = \dfrac{P_{Hub_j}\left(PL_{Hub_j j}^{(b_j)}\right)^{-1}}{\displaystyle\sum_{\substack{i \in \text{HubList}_k, \\ RBMMap_i^{(t^*)} \neq 0 \\ i \neq Hub_j}} P_i\left(PL_{ij}^{\left(b_{RBMMap_i^{(t^*)}}\right)}\right)^{-1} + \Gamma P_{Hub_j}\left(PL_{Hub_j j}^{(b_j)}\right)^{-1} + IN_j^{(t)}}$$

$$CINR_{uc,j}^{(t^*)} = \dfrac{P_{uc,Hub_j}\left(PL_{uc,Hub_j j}^{(c_j)}\right)^{-1}}{\displaystyle\sum_{\substack{i \in \text{HubList}_k, \\ RBMMap_{uc,i}^{(t^*)} \neq 0 \\ i \neq Hub_j}} P_{uc,i}\left(PL_{uc,ij}^{\left(c_{RBMMap_{uc,i}^{(t^*)}}\right)}\right)^{-1} + \Gamma P_{uc,Hub_j}\left(PL_{uc,Hub_j j}^{(c_j)}\right)^{-1} + IN_{uc,j}^{(t)}}$$

Update $R_j^{(t^*)}$ using MSC table and $CINR_j^{(t^*)}$.
Update $R_{uc,j}^{(t^*)}$ using MSC table and $CINR_{uc,j}^{(t^*)}$.

EXAMPLE 3

Per Site DCJS with Hub-Beam and Channel Selection (RFEC Measurements Required)

As in Examples 1 and 2, it is assumed clustering of Hubs and RBMs is performed prior to executing DCJS. All Hubs that belong to the same site (cell) coordinate and execute DCJS jointly. Beam selection and/or channel selection are performed jointly with scheduling. In this implementation, RFEC measurements per-site are stored and made available for look-up in the centralized server (MARA server). RFEC measurements comprise measurements on the primary and secondary carriers for each Hub-RBM radio link, and include measurements for all Hub-beams of each Hub to enable Hub-beam selection, and for all channels in the secondary carrier.

DCJS is implemented on a per site basis, using steps similar to those described in Example 2, while jointly implementing Hub-beam selection, e.g. as described in the above referenced related co-pending related patent application Ser. No. 14/255,068.

Performance metrics are shared amongst all Hubs of the site and also communicated to the centralized server.

Accordingly, systems and methods according to embodiments of the invention provide joint scheduling of primary and secondary carriers, and optionally also provide for Hub-beam and RBM beam selection, slot assignment, and power optimization.

Dual carrier joint scheduling provides a virtual frequency reuse of 1, with reuse of one licensed frequency of the primary carrier and links that are interference challenged migrate to an unlicensed band of the secondary carrier. A frequency hopping frame structure enables virtual frequency reuse of 1 with dynamic secondary carrier reuse, while the control channel is provided over the primary carrier, for robust control.

Figures 8A, 8B:
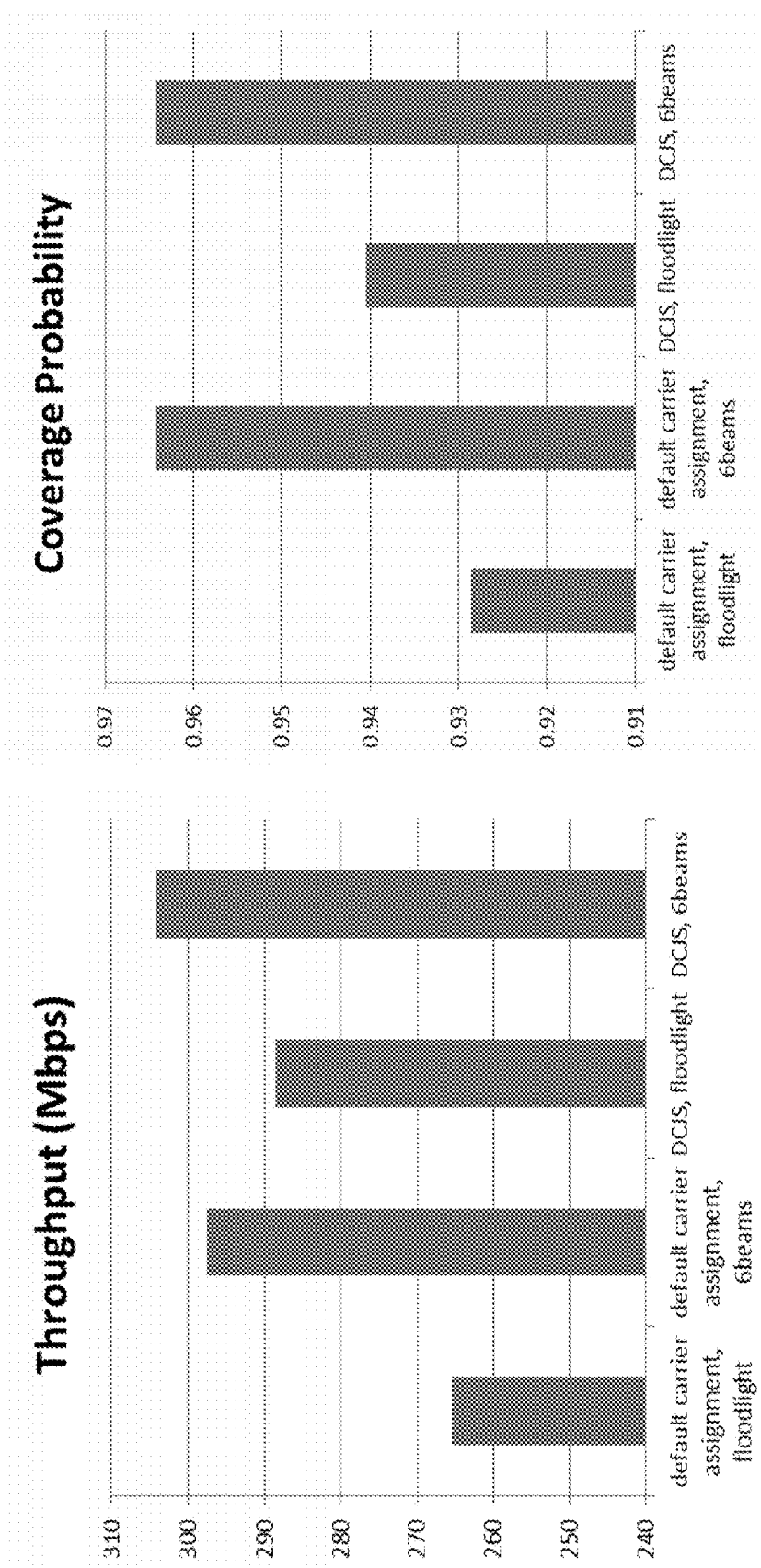
FIG. 8A shows throughput results for simulations for four scenarios: a default carrier assignment using floodlight beam only; a default carrier assignment with 6 beams and Hub-beam selection; DCJS using floodlight beam only; DCJS with 6 beams and Hub-beam selection.
FIG. 8B shows coverage probability results for simulations for four scenarios: a default carrier assignment using floodlight beam only; a default carrier assignment with 6 beams and Hub-beam selection; DCJS using floodlight beam only; DCJS with 6 beams and Hub-beam selection.

FIGS. 8A and 8B shows simulation results for various example scenarios. FIG. 8A the Throughput (Mbps) for a default carrier assignment using a floodlight beam, a default carrier assignment with Hub-beam selection (6beams); DCJS with the floodlight beam; and DCJS with Hub-beam selection (6 beams). FIG. 8B compares the Coverage Probability for the same four scenarios.

Figure 9A:
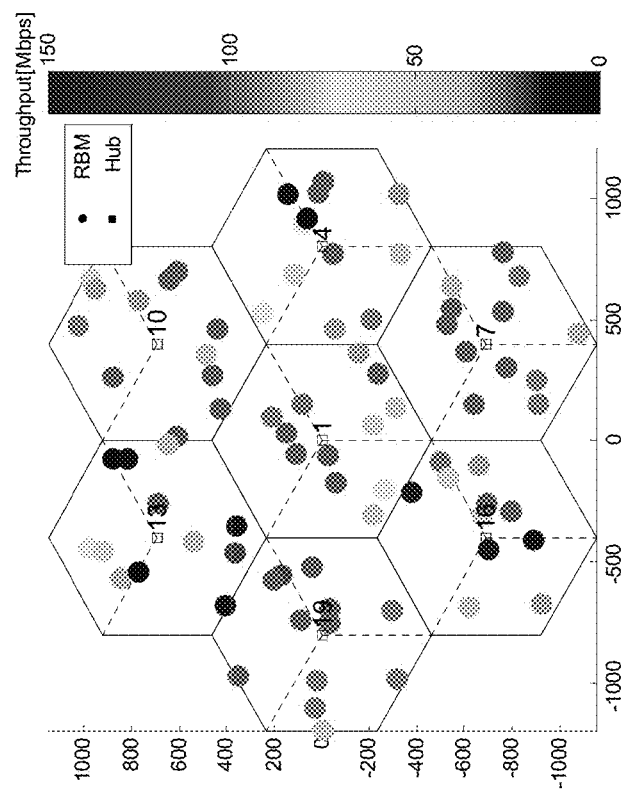
FIG. 9A shows a topology map of throughput for each RBM for a default carrier assignment.
Figure 9B:
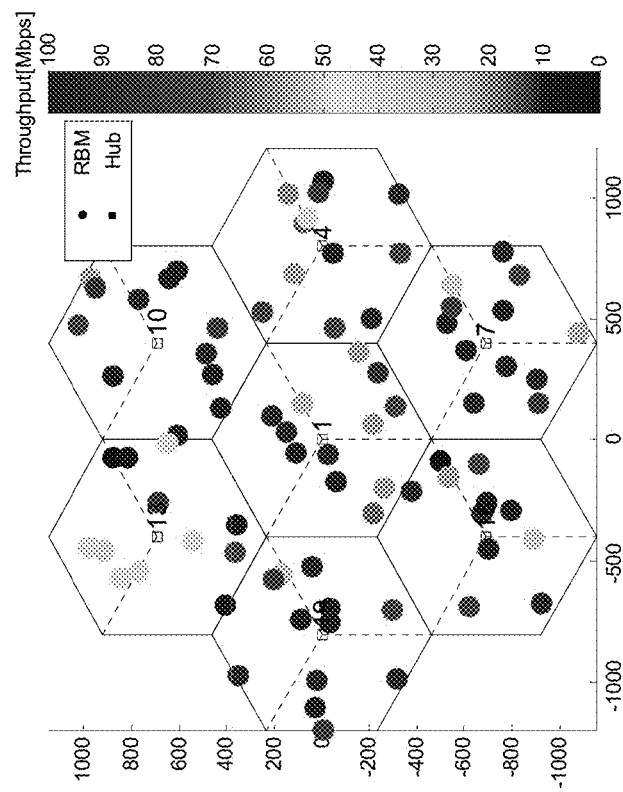
FIG. 9B shows a topology map of throughput for each RBM for with DCJS.

FIGS. 9A and 9B show, respectively, a topology view of the carrier assignments for a default carrier assignment and a DCJS channel assignment for the 6 beam scenarios.

FIG. 10 shows a simplified schematic of elements of a system comprising a centralized server 200, and communication channels between the centralized server and a plurality of sites comprising Hub modules 104, each serving a plurality of RBMs 104. The Hubs comprise a local processing unit and data storage. The centralized server comprises a centralized processing unit and data storage for network information, e.g. for storing data including the performance metrics stored as a RFEC table, RBM Maps providing assignment of RBMs to carriers and slots; and software comprising instructions for implementing DCJS, RBM mode selection, Hub-beam selection, and other processes, as required. The centralized server coordinates interference detection and sensing, coordination and implementation of carrier assignment, channel assignment, and resource assignment, which optionally includes zone coordination or slot assignment.

Although embodiments of the invention have been described and illustrated in detail, it is to be clearly understood that the same is by way of illustration and example only and not to be taken by way of limitation, the scope of the present invention being limited only by the appended claims.

Addendum: Nomenclature

| Notation | Description |
|---|---|
| i | Id |
| j | RBM id |
| k | Site id |
| t | Subframe id |
| $N_{RBM}$ | Number of RBMs |
| $N_{Hub}$ | Number of Hubs |
| T | Number of subframes per scheduling interval |
| S | Set of all RBMs = $\{1, \ldots, N_{RBM}\}$ |
| $S_i$ | Set of all RBMs connected to hub i |
| $HubList_k$ | Set of all hubs in site k (or neighborhood k) |
| $Hub_j$ | The id of the Hub which serves RBM j |
| $S_{Hub}$ | Set of Hubs = $\{1, \ldots, N_{Hub}\}$ |
| $P_i$ | Maximum transmitted power of hub i for the primary carrier (linear scale) |
| $P_{uc,i}$ | Maximum transmitted power of hub i for the secondary carrier (linear scale) |
| $P_n$ | Noise power (linear scale) |
| $RSSI_j^{(t)}$ | Received signal strength at RBM j in subframe t in the primary carrier (linear scale) |
| $RSSI_{uc,j}^{(t)}$ | Received signal strength at RBM j in subframe t in the secondary carrier (linear scale) |
| $IoT_j$ | Total interference over thermal noise experienced by RBM j in the licensed band |
| $IoT_{uc,j}$ | Total interference over thermal noise experienced by RBM j in the unlicensed band |
| $CINR_j^{(t)}$ | CINR for RBM j in subframe t in the licensed band (linear scale) |
| $CINR_{uc,j}^{(t)}$ | CINR for RBM j in subframe t in the unlicensed band (linear scale) |
| $\Gamma$ | Self-interference factor, which is equal to the reciprocal of the maximum CINR in linear scale, i.e., $\Gamma = CINR_{max}^{-1}$ |
| $PL_{ij}^{(b)}$ | Path-loss from hub i and RBM j in subframe t, using beam b in the licensed band (linear scale) |
| $PL_{uc,ij}^{(c)}$ | Path-loss from hub i and RBM j in subframe t, using channel c, in the unlicensed band (linear scale) |
| $b_j$ | Hub-beam used for RBM j in the primary carrier |
| $c_j$ | Frequency channel used for RBM j in the secondary carrier |
| $N_b$ | Number of beams in the primary carrier |
| $N_c$ | Number of channels in the secondary carrier |
| $R_j^{(t)}$ | Achievable rate for RBM j in subframe t in the licensed band |
| $R_{uc,j}^{(t)}$ | CINR for RBM j served by Hub i if it is scheduled in subframe t in the unlicensed band |
| $\bar{R}_j$ | The total Rate for RBM j |
| $RBMMap_i^{(t)}$ | RBM id of the RBM associated to Hub i and scheduled in subframe t in the licensed band |
| $RBMMap_{uc,i}^{(t)}$ | RBM id of the RBM associated to Hub i and scheduled in subframe t in the unlicensed band |
| $HubBeam_i^{(t)}$ | Beam antenna used by Hub i in subframe t in the licensed band |
| $Channel_{uc,i}^{(t)}$ | Channel id of the channel selected by Hub i in subframe t in the unlicensed band |
| I (statement) | Indicator function such that $I(\text{statement}) = \begin{cases} 1, & \text{statement is true,} \\ 0, & \text{statement is false.} \end{cases}$ |
| $D_{target}$ | Target minimum delay |
| $D_j^{(t)}$ | Delay for RBM j if it is assigned subframe t in either the licensed band or unlicensed band. It is also a function of the current scheduling maps $RBMMap$, $RBMMap_{uc}$ |
| $\Phi_D(D_j^{(t)}; D_{target})$ | Delay penalty function: $\Phi_D(D_j^{(t)}; D_{target})$ is large if $D_j^{(t)} > D_{target}$, and zero otherwise. |
| $PA_j^{(t)}$ | PA penalty that is equal to $\infty$ if RBM j is already scheduled in either the primary or the secondary carrier in subframe t in the uplink, and zero otherwise. |

The invention claimed is:

1. A method of joint scheduling in a dual-carrier fixed wireless backhaul network operating with a primary carrier and a secondary carrier, the wireless backhaul network comprising a plurality of nodes comprising a plurality of Hub modules, each Hub module serving one or more remote backhaul modules (RBMs) through Hub-RBM radio links, wherein the method comprises:

for Hub modules (Hubs) and RBMs configured for dual-carrier operation using the primary carrier and the secondary carrier, and wherein the primary carrier is a licensed band and the secondary carrier is a lower cost shared band or an unlicensed band, providing a frame structure wherein control signaling messages are carried on the primary carrier;

performing network entry for each said RBM on the primary carrier; and performing carrier assignment wherein each Hub transmits a broadcast frame on the primary carrier assigning each served RBM to the primary carrier or the secondary carrier; and wherein performing network entry further comprises:
  performing Hub-RBM clustering comprising associating each RBM to a respective serving Hub; and for Hubs and/or RBMs having one or more beams, performing Hub-beam selection and RBM-beam selection for each Hub-RBM radio link;
  obtaining initial performance metrics, including path-loss information, for Hub-RBM radio links between each RBM and its respective serving Hub using the primary carrier, and storing said performance metrics for each Hub-RBM link in a centralized processing unit;

and wherein performing carrier assignment further comprises:
  for Hub-RBM links for each Hub and respective served RBMs of at least part of the network (neighborhood):
    a) obtaining a performance metric and computing a utility gain for each of a plurality of time slot assignments on the primary carrier;
    b) obtaining a performance metric and computing a utility gain for each of a plurality of time slot assignments on the secondary carrier and for each channel of the secondary carrier;
    c) storing in the centralized processing unit, tables or maps of utility gain values from steps a) and b) and computing therefrom a maximum achievable sum utility over the neighborhood;

d) selecting for each RBM
 a time slot of the primary carrier; or
 a time slot of the secondary carrier;
 to optimize the sum utility over the neighborhood;
e) scheduling each RBM to the selected carrier and time slot; and
f) for each Hub-RBM radio link, selecting a transmission mode and a Modulation and Coding Scheme (MCS) based on instantaneous channel conditions and to meet an RBM quality of service requirement.

2. The method of claim 1, wherein the secondary carrier is an unlicensed band comprising a plurality of channels, and wherein the control signaling messages for RBMs assigned to the secondary carrier comprise a channel assignment and a fallback channel assignment.

3. The method of claim 1, wherein joint scheduling is coordinated by a centralized processing unit that communicates with each Hub and wherein performance metrics, carrier assignments and slot assignments are communicated between RBMs and their serving Hubs using said control signaling on the primary carrier.

4. The method of claim 1, wherein performance metrics, carrier assignments and slot assignments are stored for look-up in a centralized server.

5. The method of claim 1, comprising generating a first RBM map for RBMs assigned to the primary carrier and generating a second RBM map for RBMs assigned to the secondary carrier, said second RBM map further comprising RBM channel assignments for each RBM.

6. The method of claim 1, wherein obtaining performance metrics comprises performing Radio Frequency Environment Characteristics (RFEC) measurements to generate an RFEC interference map comprising performance metrics for each Hub-RBM radio link, and wherein:
 RBMs having a performance metric above a performance threshold are assigned to slots on the primary carrier;
 other RBMS are assigned to the secondary carrier; and
 then the RBMS assigned to the secondary carrier are given a channel assignment based on channel availability and/or performance metrics from a RFEC interference map.

7. The method of claim 1, wherein the sum utility is optimized for a set of Hub-RBM links of a neighborhood comprising:
 a Hub (sector); or
 a site comprising a plurality of co-located Hubs; or
 across multiple sites of the network; or
 over the entire network.

8. The method of claim 1, performed for each sector on a neighborhood basis, wherein:
 in step a) each Hub computes predicted CINRs for each RBM served by the Hub for each time slot for the primary carrier;
 in step b) each Hub computes predicted CINRs for each RBM served by the Hub for each time slot for the secondary carrier, for each channel; and
 then each Hub assigns to each served RBM a time slot on the primary carrier or secondary carrier such that the sum utility is maximized over the neighborhood.

9. The method of claim 8, wherein the neighborhood is one of: a single Hub; a set of co-located Hubs; Hubs of a plurality of sites; and all Hubs in the network.

10. The method of claim 1, wherein the RBMs comprise multi-mode RBMs, and further comprising performing RBM reception mode selection wherein each RBM reports to its serving Hub, one or more of:
 a pathloss PL for each RBM-beam using the primary and secondary carriers;
 RSSIs measured for each time slot on the primary and secondary carriers; and
 a reception mode and corresponding reception mode gains.

11. The method of claim 1, wherein the channel assignment includes a primary channel and a fall back channel.

12. The method of claim 1, wherein the performance metric for each RBM comprises one of:
 a spectral efficiency on the primary carrier;
 a channel gain with respect to its serving Hub greater than a threshold;
 a channel gain with respect to one or more interfering Hubs greater than a threshold; and
 a Quality of Service (QoS) satisfaction indicator, including throughput and delay requirements.

13. The method of claim 1, wherein assigning each RBM to the selected carrier and time slot to optimize the sum utility over the set of Hubs comprises control channel signaling on the primary carrier.

14. A system for joint scheduling in a dual-carrier fixed wireless backhaul network comprising a plurality of nodes, wherein each node comprises a plurality of Hub modules, each Hub module serving one or more Remote Backhaul Modules (RBMs) through Hub-RBM radio links, at least some of said Hub modules and RBMs being configured for dual-carrier operation with a primary carrier and a secondary carrier, wherein the primary carrier is a licensed band and the secondary carrier is a lower cost shared band or an unlicensed band, and the system further comprising a centralized server or centralized processing unit for coordinating Dual Carrier Joint Scheduling (DCJS) across the network using a primary carrier and a secondary carrier, and wherein the centralized server or centralized processing unit is configured for implementing joint scheduling comprising the steps of:
 for Hub modules (Hubs) and RBMs configured for dual-carrier operation using the primary carrier and the secondary carrier, and wherein the primary carrier is a licensed band and the secondary carrier is a lower cost shared band or an unlicensed band, providing a frame structure wherein control signaling messages are carried on the primary carrier;
 performing network entry for each said RBM on the primary carrier; and
 performing carrier assignment wherein each Hub transmits a broadcast frame on the primary carrier assigning each served RBM to the primary carrier or the secondary carrier; and
 wherein performing network entry further comprises:
  performing Hub-RBM clustering comprising associating each RBM to a respective serving Hub; and for Hubs and/or RBMs having one or more beams, performing Hub-beam selection and RBM-beam selection for each Hub-RBM radio link;
  obtaining initial performance metrics, including pathloss information, for Hub-RBM radio links between each RBM and its respective serving Hub using the primary carrier, and storing said performance metrics for each Hub-RBM link in a centralized processing unit;
 and
 wherein performing carrier assignment further comprises:
 for Hub-RBM links for each Hub and respective served RBMs of at least part of the network (neighborhood):

a) obtaining a performance metric and computing a utility gain for each of a plurality of time slot assignments on the primary carrier;
b) obtaining a performance metric and computing a utility gain for each of a plurality of time slot assignments on the secondary carrier and for each channel of the secondary carrier;
c) storing in the centralized processing unit, tables or maps of utility gain values from steps a) and b) and computing therefrom a maximum achievable sum utility over the neighborhood;
d) selecting for each RBM
  a time slot of the primary carrier; or
  a time slot of the secondary carrier;
  to optimize the sum utility over the neighborhood;
e) scheduling each RBM to the selected carrier and time slot; and
f) for each Hub-RBM radio link, selecting a transmission mode and a Modulation and Coding Scheme (MCS) based on instantaneous channel conditions and to meet an RBM quality of service requirement.

15. The system of claim 14, wherein the centralized server or processing unit provides for DJCS to be implemented across the entire network, across a neighborhood comprising a plurality of sites, on a per site basis for a plurality of co-located Hubs, or on a per sector basis.

16. The system of claim 14, wherein, when DCJS is carried out for a small neighbourhood comprising a single site or a single sector, a processing unit of each respective Hub performs measurements of metrics, communicates performance metrics and other data to the centralized server to storage and look-up and optionally shares data directly with other Hubs of the site.

17. The system of claim 14, wherein the centralized server stores performance metrics for each Hub-RBM radio link for look-up and coordinates obtaining performance metrics for each Hub-RBM radio link, by performing RFEC measurements.

18. The system of claim 14, wherein the centralized server coordinates:
a) obtaining a performance metric and computing a utility gain for each of a plurality of time slot assignments on the primary carrier;
b) obtaining a performance metric and computing a utility gain for each of a plurality of time slot assignments on the secondary carrier;
and the centralized server stores, tables or maps of utility gain values from steps a) and b) and computes therefrom a maximum achievable sum utility over the neighborhood.

19. The system of claim 14 wherein the centralized server is configured to coordinate implementation of joint DCJS by one or more of:
  per sector DCJS with fixed Hub-beam and channel assignments;
  per site DCJS with fixed Hub-beam and channel assignments;
  per neighborhood and per network DCJS with fixed beam and channel assignments;
  per sector, per site, per neighborhood or per network DJCS with Hub-beam selection and channel selection.

20. The system of claim 14 wherein the centralized server coordinates interference detection and sensing, coordination and implementation of carrier assignment, channel assignment, and resource assignment, which optionally includes zone coordination or slot assignment.

21. A non-transitory computer readable storage medium in a dual-carrier fixed wireless backhaul network comprising a plurality of nodes comprising a plurality of Hub modules, each Hub module serving one or more remote backhaul modules (RBMs) through Hub-RBM radio links, at least some of said Hub modules and RBMs being configured for dual-carrier operation on a primary carrier and a secondary carrier, wherein the primary carrier is a licensed band, and the secondary carrier is a lower cost shared band or an unlicensed band, and said computer readable storage medium being centralized or distributed and storing instructions, which when executed in one or more processing units of the backhaul network, implement dual carrier joint scheduling comprising the steps of:
  for Hub modules (Hubs) and RBMs configured for dual-carrier operation using the primary carrier and the secondary carrier, and wherein the primary carrier is a licensed band and the secondary carrier is a lower cost shared band or an unlicensed band, providing a frame structure wherein control signaling messages are carried on the primary carrier;
  performing network entry for each said RBM on the primary carrier; and
  performing carrier assignment wherein each Hub transmits a broadcast frame on the primary carrier assigning each served RBM to the primary carrier or the secondary carrier; and
  wherein performing network entry further comprises:
    performing Hub-RBM clustering comprising associating each RBM to a respective serving Hub; and for Hubs and/or RBMs having one or more beams, performing Hub-beam selection and RBM-beam selection for each Hub-RBM radio link;
    obtaining initial performance metrics, including path-loss information, for Hub-RBM radio links between each RBM and its respective serving Hub using the primary carrier, and storing said performance metrics for each Hub-RBM link in a centralized processing unit;
  and
  wherein performing carrier assignment further comprises:
    for Hub-RBM links for each Hub and respective served RBMs of at least part of the network (neighborhood):
    a) obtaining a performance metric and computing a utility gain for each of a plurality of time slot assignments on the primary carrier;
    b) obtaining a performance metric and computing a utility gain for each of a plurality of time slot assignments on the secondary carrier and for each channel of the secondary carrier;
    c) storing in the centralized processing unit, tables or maps of utility gain values from steps a) and b) and computing therefrom a maximum achievable sum utility over the neighborhood;
    d) selecting for each RBM
      a time slot of the primary carrier; or
      a time slot of the secondary carrier;
      to optimize the sum utility over the neighborhood;
    e) scheduling each RBM to the selected carrier and time slot; and
    f) for each Hub-RBM radio link, selecting a transmission mode and a Modulation and Coding Scheme (MCS) based on instantaneous channel conditions and to meet an RBM quality of service requirement.

22. A method of joint scheduling in a dual-carrier fixed wireless backhaul network comprising a plurality of nodes, each node comprising a plurality of Hub modules, each Hub module serving one or more remote backhaul modules (RBMs) through Hub-RBM radio links and operating with a primary carrier and a secondary carrier, the primary carrier being a licensed band and the secondary carrier being a lower cost shared band or an unlicensed band, wherein the method comprises:

in an initialization phase:
        performing Hub-RBM clustering comprising associating each RBM to a respective serving Hub; and for Hubs and/or RBMs having one or more beams, performing Hub-beam selection and RBM-beam selection for each Hub-RBM radio link;
        obtaining initial performance metrics, including path-loss information, for Hub-RBM radio links between each RBM and its respective serving Hub using the primary carrier, and storing said performance metrics for each Hub-RBM link in a centralized processing unit;
    in a data collection phase:
    for Hub-RBM links for each Hub and respective served RBMs of at least part of the network (neighborhood):
        a) obtaining a performance metric and computing a utility gain for each of a plurality of time slot assignments on the primary carrier;
        b) obtaining a performance metric and computing a utility gain for each of a plurality of time slot assignments on the secondary carrier and for each channel of the secondary carrier;
    in a parameter selection phase:
        c) storing in the centralized processing unit, tables of utility gain values from steps a) and b) and computing therefrom a maximum achievable sum utility over the neighborhood;
        d) selecting for each RBM
            a time slot of the primary carrier; or
            a time slot of the secondary carrier;
    to optimize the sum utility over the neighborhood;
    in a parameter application phase:
        e) scheduling each RBM to the selected carrier and time slot; and
        f) for each Hub-RBM radio link, selecting a transmission mode and a Modulation and Coding Scheme (MCS) based on instantaneous channel conditions and to meet an RBM quality of service requirement.

\* \* \* \* \*